Nov. 20, 1956 W. JACOBS 2,770,974
DEVICE FOR PRODUCING RECIPROCATING MOVEMENT FROM ROTARY

Filed June 14, 1952

Inventor:
WERNER JACOBS
By Frederick E. Hane
ATTORNEY

United States Patent Office 2,770,974
Patented Nov. 20, 1956

2,770,974

DEVICE FOR PRODUCING RECIPROCATING MOVEMENT FROM ROTARY

Werner Jacobs, Kitzingen am Main, Germany

Application June 14, 1952, Serial No. 293,615

4 Claims. (Cl. 74—54)

This invention relates to a device for producing vibrating or oscillating movements of any desired, but preferably high frequency at short amplitudes, by the employment of a ball, roller, or other type of antifriction bearing, to which for the purpose of the invention an undulating race track is being given. The undulations, in accordance with the invention, are preferably axially directed and of a number equal to the number of the antifriction members, or to a multiple thereof.

As compared with other arrangements which have hitherto been devised for the same or similar purposes, such as eccentrics, cranks, tumbling disks, or others, a device in accordance with the present invention offers all the advantages of rolling friction. It simultaneously permits of transferring low speeds into high speeds, and of distributing the load over a comparatively large number of antifriction members.

There are many uses for a device in accordance with the invention, which can be employed in practically all cases in which vibratory or oscillatory movements are required, as for instance in connection with tools, laboratory implements for the carrying out of high oscillation tests, massage instruments, and many others.

Figure 1:
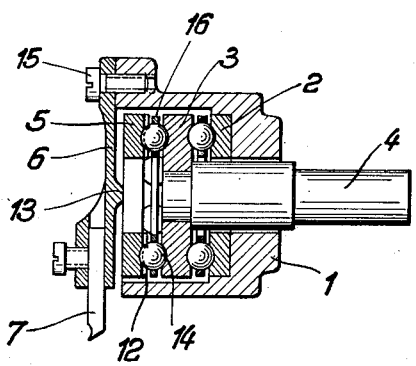
Figure 2:
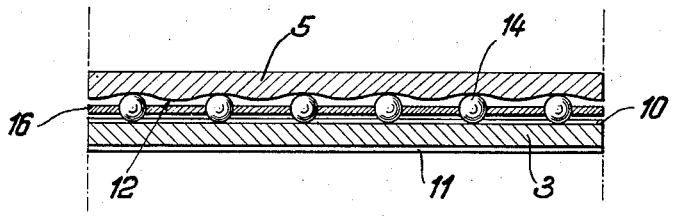

The accompanying drawing illustrates a device in accordance with the invention by way of example as applied to a cutting tool holder. Fig. 1 is a vertical longitudinal section through the device and Fig. 2 the development, in section, of the vibration transmitting ball race provided therein.

According to this drawing there is provided within a housing 1 a double race antifriction bearing, the ring 2 of which is arranged to be fast in the housing. Ring 3 is driven by the shaft 4 to the end of which it is fixed. While both race tracks 10 and 11 of the bearing ring 3 are plain, that of the loosely mounted ring 5 is provided with axially disposed undulations 12. A tensioned leaf spring 6 fixed by means of a screw 15 to the housing 1 serves to press the ring in the direction of ring 3 for example by means of a ridge 13 or any other resilient means adapted to bear on the ring 5. In the example shown this spring 6 is of a shape which forms a holder for the tool 7 which is to be vibrated.

When the ring 3 is rotated by the shaft 4, the antifriction members 14, which may be balls, rollers, or the like, and which, including their ball cages 16, are arranged between the rings 3 and 5 to produce an oscillatory or vibratory movement of ring 5 in conformity with the number and magnitude of the undulations 12 in its race track. The oscillations or vibrations produced in this way are transmitted by the leaf spring 6 onto the tool 7 fixed therein.

It is to be understood that the invention is not intended to be limited to the example shown and described. Instead of the ring race bearing other antifriction bearings may be employed which are suitable for the transmission of axially directed forces. The leaf spring also may be replaced by some other element, and the arrangement and control of the tool may be of a different type to that shown in the drawing. Instead of the tool shown any other tool, instrument or other contrivance can be employed, or there may be no such contrivance at all if it is desired to use the vibrations produced in some other way.

What I claim and desire to secure by Letters Patent of the United States is:

1. In a device for converting rotary motion into reciprocating movement having two ball races and a plurality of revoluble antifriction members interposed between the two ball races, a plain ball race, means for imparting movement to the said plain ball race, an undulated ball race loosely positioned opposite said plain ball race, mutually spaced antifriction members interposed between the said plain and the said undulated ball races, and resilient means for pressing said undulated ball race in the direction of said plain ball race.

2. In a device for converting rotary motion into reciprocating movement having two ball races and a plurality of revoluble antifriction members interposed between the two ball races, a driving shaft, a plain ball race fixed to the said driving shaft, an undulated ball race loosely positioned opposite the said plain ball race, antifriction members spaced in a circle between the said two ball races, and a spring for pressing said undulated ball race and said antifriction members against said plain ball race.

3. A device for converting rotary motion into reciprocating movement as set forth in claim 2, in which the antifriction members between the said plain and the said undulated ball races are balls.

4. In a device for converting rotary motion into reciprocating movement having two ball races and a plurality of revoluble antifriction members interposed between the two ball races, a driving shaft, a housing, said driving shaft extending into said housing, a bearing ring fixed to the end of said driving shaft within the said housing, a plain ball race in the said bearing ring, a second bearing ring loosely mounted opposite the first bearing ring, axially disposed undulations on said second bearing ring, a plurality of balls arranged between the said bearing rings one in each recession of the said undulations, and a leaf spring on the said housing for pressing said second bearing ring and the said balls axially in the direction of the said first bearing ring.

References Cited in the file of this patent

UNITED STATES PATENTS

| Number | Name | Date |
|---|---|---|
| 143,480 | Webb | Oct. 7, 1873 |
| 704,810 | Locke | July 15, 1902 |
| 1,009,353 | Thomas | Nov. 21, 1911 |
| 1,041,569 | Bade | Oct. 15, 1912 |
| 1,196,656 | Bugbee | Aug. 29, 1916 |
| 1,367,827 | Noble | Feb. 8, 1921 |
| 1,450,184 | Moore | Apr. 3, 1923 |
| 2,401,794 | Pratt | June 11, 1946 |
| 2,424,116 | Puerner | July 15, 1947 |
| 2,458,929 | Clark | Jan. 11, 1949 |
| 2,465,028 | McNaughton | Mar. 22, 1949 |
| 2,607,568 | Seavey | Aug. 19, 1952 |
| 2,617,949 | Leland | Nov. 11, 1952 |